United States Patent
Harrison

(10) Patent No.: US 8,362,153 B2
(45) Date of Patent: Jan. 29, 2013

(54) POLYISOBUTENYL SULFONATES HAVING LOW POLYDISPERSITY

(75) Inventor: James J. Harrison, Novato, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 229 days.

(21) Appl. No.: 11/611,753

(22) Filed: Dec. 15, 2006

(65) Prior Publication Data

US 2008/0146476 A1    Jun. 19, 2008

(51) Int. Cl.
*C08F 271/02* (2006.01)

(52) U.S. Cl. ............ 525/279; 508/567; 524/81; 524/83; 524/86; 524/96; 524/104; 524/105; 524/106; 524/395; 524/398; 525/281; 525/333.9; 525/344; 525/353; 525/379; 525/382; 526/82; 526/83; 526/85; 526/131; 526/157; 526/348.7

(58) Field of Classification Search .................. 508/567; 525/279, 281, 333.7, 333.9, 343, 344, 353, 525/334, 379, 38; 524/81, 83, 86, 96, 104, 524/105, 106, 395, 398; 526/82, 83, 85, 526/131, 157, 348.7

See application file for complete search history.

(56) References Cited

U.S. PATENT DOCUMENTS

| | | | |
|---|---|---|---|
| 3,954,849 A | 5/1976 | Karll et al. | |
| 4,105,647 A | 8/1978 | O'Farrell et al. | |
| 4,137,184 A | 1/1979 | Bakker | |
| 4,157,432 A | 6/1979 | Lundberg et al. | |
| 4,764,295 A | 8/1988 | Le Coent | |
| 5,408,018 A * | 4/1995 | Rath ............................ | 526/237 |
| 5,444,135 A | 8/1995 | Cherademe et al. | |
| 5,448,000 A | 9/1995 | Gullapalli et al. | |
| 5,629,394 A | 5/1997 | Cheradame et al. | |
| 5,939,594 A | 8/1999 | Le Coent | |
| 6,054,419 A | 4/2000 | Le Coent | |
| 6,204,226 B1 | 3/2001 | Le Coent et al. | |
| 6,407,186 B1 | 6/2002 | Rath et al. | |
| 6,410,491 B1 | 6/2002 | Harrison et al. | |
| 6,632,781 B2 | 10/2003 | Harrison et al. | |
| 6,734,148 B2 | 5/2004 | Bell et al. | |
| 6,743,757 B2 | 6/2004 | Bell et al. | |
| 7,037,999 B2 | 5/2006 | Baxter, Jr. et al. | |
| 7,071,275 B2 | 7/2006 | Rath et al. | |
| 7,091,285 B2 | 8/2006 | Baxter, Jr. et al. | |
| 7,132,488 B2 | 11/2006 | Huffer et al. | |
| 2004/0018946 A1 | 1/2004 | Aoyagi et al. | |
| 2004/0260033 A1 * | 12/2004 | Stokes et al. .................. | 525/375 |
| 2005/0059560 A1 * | 3/2005 | Meyer et al. .................. | 508/391 |
| 2005/0171294 A1 | 8/2005 | Rath et al. | |
| 2006/0041081 A1 * | 2/2006 | Stokes et al. ............... | 525/333.7 |
| 2006/0041083 A1 | 2/2006 | Stokes et al. | |

FOREIGN PATENT DOCUMENTS

| | | |
|---|---|---|
| EP | 1 298 191 | 4/2003 |
| EP | 1 489 109 | 12/2004 |
| EP | 1489109 A2 | 12/2004 |
| EP | 1514881 A1 | 3/2005 |
| WO | WO 94/13706 | 6/1994 |

OTHER PUBLICATIONS

European Search Report.
Simison et al. "End-Quenching of Quasiliving Carbocationic Isobutylene Polymerization with Hindered Bases", *Macromolecules*, vol. 39, No. 7, pp. 2481-2487 (Mar. 2, 2006).

\* cited by examiner

*Primary Examiner* — Robert C Boyle

(57) ABSTRACT

The present invention provides for polyisobutenyl sulfonates, methods for preparing them, and composition employing them; wherein said polyisobutenyl sulfonates have improved low temperature and high temperature viscometric properties. The polyisobutenyl sulfonates are prepared by sulfonating polyisobutene and reacting the polyisobutenyl sulfonate with an alkali metal or alkaline earth metal, wherein the polyisobutene is characterized by having at least 90 mole percent methyl-vinylidene, a number average molecular weight of about 350 to 5,000, and a ratio of weight average molecular weight to number average molecular weight $M_w/M_n$ of from about 1.01 to about 1.4.

19 Claims, No Drawings

POLYISOBUTENYL SULFONATES HAVING LOW POLYDISPERSITY

FIELD OF THE INVENTION

The present invention relates to the polyisobutenyl sulfonic acid and to polyisobutenyl sulfonates prepared from highly reactive exo-olefin polyisobutene characterized by narrow molecular weight distribution polydispersity $M_w/M_n$ of less than 1.4. These polyisobutenyl sulfonates have improved viscometric properties, particularly low and high temperature viscosity and tire useful detergents and high molecular weight dispersants in lubricating oil compositions.

BACKGROUND

Sulfonates are a class of chemicals used in household, industrial, and institutional cleaning applications, personal care and agricultural products, metalworking fluids, industrial processes, emulsifying agents, corrosion inhibitors and as additives in lubricating oils. Some of the desirable properties of sulfonates for use in lubricating oil applications include their low cost, compatibility, water tolerance, corrosion inhibition, emulsion performance, friction properties, high temperature stability, rust performance, and light color.

Sulfonates that are used in lubricating oil applications have been classified as either neutral sulfonates, low overbased (LOB) sulfonates, or high overbased (HOB) sulfonates. In the past, natural sulfonates, made as a by-product of white oil and process oil production, dominated the sulfonate market. However, as refineries switched to hydrotreating processes, which gave improved yields of process oils and white oils, and as the desire for higher utilization of raw materials and thus improved economics grew, synthetic sulfonates have became more readily available. Synthetic sulfonates now have a major market and have been prepared from synthetic sulphonic acids which have in turn been prepared for example by the sulphonation of $C_{12}$ to $C_{60+}$ alkyl substituted benzene, or xylene or toluene compounds and mixtures thereof. It has been found that same synthetic sulphonic acids are difficult to neutralize, for example magnesium hydroxide or lime, to produce sulfonates which have acceptable properties; the attempted neutralization results in the production of gelatinous products which for example can be solid at room temperature. Many synthetic sulfonates have been produced from sulfonated polyalkyl aromatic compounds; see for example U.S. Pat. No. 4,764,295. Numerous methods and compositions have been developed to improve the overall viscometric property of these sulfonates, see for example U.S. Pat. Nos. 5,939,594, 6,054,419 and 6,204,226.

Polyalkenyl sulfonates and processes for their preparation are known in the art. U.S. Pat. No. 3,954,849 discloses a two step process for preparing a mixture of alkenyl sulfonic acids wherein the alkenyl group is a propene or butene polymers having a number average molecular weight of 250 to 500. U.S. Pat. No. 4,105,647 discloses a process for sulfonating polymers which are prepared by solution polymerization using Friedel-Crafts of Ziegler-type catalyst. U.S. Pat. No. 4,157,432 discloses of a sulfonation process employing homopolymers and copolymers which may contain a high level of olefinic unsaturation, typically internal unsaturation in the polymer backbone. U.S. Pat. No. 6,410,491 discloses a method for making a polyalkenyl sulfonates wherein the polyalkenyl sulfonic acid is derived from a mixture of polyalkene comprising greater than 20 mole percent alkyl vinylidene and 1,1-dialkyl isomers and polyisobutene sulfonates derived therefrom. U.S. Pat. Nos. 6,632,781 and 7,012,045 disclose particular applications which employ this polyisobutenyl sulfonate. The degree of reactivity, oil solubility, detergeney effect and viscosity behavior are influenced by the polyisobutene characteristics. The high percent alkyl vinylidene polyisobutene of U.S. Pat. No. 6,430,491 is typically made with a $BF_3$ catalyst and commonly contains a polydispersity of about 1.65 to about 2.0. Thus, these polyisobutylenes (although containing a high proportion of reactive end groups) contain a range of molecular weights within the distribution. The large molecular weight distribution is a consequence of the polyisobutene reaction type and leads to a comparatively high molecular non-uniformity of these polyisobutene sulfonates, it has been showed herein, that this relatively large molecular weight distribution (range of low molecular weight to high molecular weight polyisobutenyl sulfonate) impacts the overall viscosity behavior and low temperature viscosity performance. Polyisobutenyl sulfonates having a relatively narrow distribution of molecular weight and have a high methyl-vinylidene end group may be prepared for example by cationic quasi-living polymerization of isobutene.

The present invention is directed in part to the unexpected discovery that polyisobutene sulfonates having a high proportion of reactive end groups and having a relatively narrow molecular weight distribution lead to improved viscometrics, particularly in kinematic viscosity (kv), intrinsic viscosity, and in low temperature performance such as that demonstrated in the cold, cranking simulator (CCS).

SUMMARY OF THE INVENTION

The present invention provides for polyisobutenyl sulfonates, methods for preparing them, and composition employing them; wherein said polyisobutenyl sulfonates have improved low temperature and high temperature viscometric properties. The polyisobutenyl sulfonates are prepared by sulfonating polyisobutene and reacting the polyisobutenyl sulfonate with an alkali metal of alkaline earth metal, wherein the polyisobutene is characterized by having at least 90 mole percent methyl-vinylidene, a number average molecular weight of about 350 to 5,000, and a ratio of weight average molecular weight to number average molecular weight $M_w/M_n$ of from about 1.01 to about 1.4. Polyisobutene having these characteristics can be prepared by cationic quasi-living polymerization with end group functionalization. More specifically, disclosed is a process for preparing a polyisobutenyl sulfonate comprising:

a. polymerizing isobutene in a quasi-living polymer system to form a quasi-living carbocationically terminated polymer comprising contacting an isobutene monomer with an initiator in the presence of a Lewis Acid and solvent, under suitable quasi-living polymerization reaction conditions to obtain a polymer having a number average molecular weight of about 350 to 5,000, and a ratio of weight average molecular weight to number average molecular weight $M_w/M_n$ of less than about 1.4;

b. contacting the polymer prepared in step a) with a suitable quenching agent whereby said quenching agent converts the quasi-living carbocationically terminated polymer to a polyisobutene polymer having at least 90 mole percent methyl-vinylidene content;

c. reacting the polyisobutene polymer of step b) with a sulfonating agent in a ratio of 0.9 to 1.2 and thereafter neutralizing with a source of alkali metal or alkaline earth metal.

The quasi-living polymer system used to form a quasi-living carbocationically terminated polymer is formed by contacting an isobutene monomer with an initiator in the presence of a Lewis Acid and solvent, under suitable quasi-living polymerization reaction conditions to obtain a quasi-living carbocationically terminated polymer. Suitable quasi-living carbocationically terminated polymers can be formed by ionizing a polyolefin chain end, commonly halides, in the presence of a Lewis acid and a solvent under suitable quasi-living polymerization reaction conditions. This quasi-living carbocationically terminated polymer polymerization monomer is conducted with a quenching agent under suitable conditions to enable the quenching agent to interact with the reactive chain end of the polyolefin and facilitate the removal of a proton from the reactive chain end, thereby forming the methyl-vinylidene end group. Thus, selecting suitable quenching reaction system conditions (temperature, Lewis Acid, solvent) can optimize conversion to the desired vinylidene terminated polymer. Preferably, conversion is greater that 90 mole % and even up to 100 mole % when compared to a control at the same conditions in the absence of a quenching agent; and thus the polyisobutene polymer product can have a high methyl-vinylidene content. These preferred polyisobutene typically have a methyl-vinylidene content of greater than 90 mole %, preferably greater than 95 mole %, such as having at least 98 to 100 mole % with a narrow polydispersity of less than 1.4, preferably less than 1.3 to about 1.01, and more preferably about 1.1 or less. Preferred number average molecular weights of the above are from 350 to 5,000; with low molecular weights of less than 550, middle molecular weights form 550 to 1,000, and higher molecular weights such as greater than 1,000, more like greater than 2,000, being preferred within the range.

An aspect of the present invention is directed to a polyisobutenyl sulfonic acid composition obtained by reacting: a polyisobutene characterized by having at least 90 mole percent methyl-vinylidene, a number average molecular weight of about 350 to 5,000, and a ratio of weight average molecular weight to number average molecular weight $M_w/M_n$ of less than about 1.4; with a sulfonating agent. The polyisobutenyl sulfonic acid of this invention can be neutralized and/or overbased to provide a polyisobutenyl sulfonate, which for example can be used in a lubricating oil composition and useful as a detergent.

A further aspect of the present invention is directed to a polyisobutenyl sulfonates which are useful as ionic dispersants in preventing sludge and varnish in an internal combustion engine and preventing viscosity increase due to soot in diesel engines. In general it has been determined that low molecular weight polyisobutenyl sulfonates, less than 500 (such as from about 350-500) molecular weight act primarily as detergents, and high molecular Weight polyisobutenyl sulfonates, greater than 2,000 (such as from about 2,000 to 5,000) molecular weight act as ionic dispersants. Intermediate molecular weights may act in both ways. In this regard, the present invention is directed to the use of a polyisobutenyl sulfonate as an ionic dispersant in a lubrication oil composition and more preferably to those employing the higher molecular weights. Particularly preferred polyisobutenyl sulfonates are derived from sulfonation of polyisobutene that is characterized by having at least 90 mole percent methyl-vinylidene, a number average molecular weight of about 2,000 to 5,000, and a ratio of weight average molecular weight to number average molecular weight $M_w/M_n$ of from about 1.01 to about 1.4; followed by neutralization with an ashless base such as ammonium hydroxide, tetra-methyl ammonium hydroxide, tetra-n-butyl ammonium hydroxide or with a alkali metal such as sodium or potassium.

DETAILED DESCRIPTION

The polyisobutene having a reactive end group or exo-olefin end group of at least 90% and a polydispersity Mw/Mn of <1.4 can be conveniently prepared by a quasi-living polymerization reaction of isobutylene followed by quenching. Wherein the term "quasi-living polymerization" as used herein refers to living polymerizations wherein reversible chain terminations is operable, but the rates of irreversible chain termination and chain transfer approach zero and the term "quenching agent" as used herein refers to a chemical compound which is added to a polymerization reaction to react with the polymer chain end in the presence of an active Lewis acid. The quenching agent facilitates the removal of a proton from the reactive chain end. Quasi-living polymerization is has been referred to as living polymerization and is known in the art (although true living polymerization refers to polymerizations that proceed in the absence of measurable chain transfer and chain termination) using a variety of systems, some of which are described in U.S. Pat. Nos. 5,350,819; 5,169,914; and 4,910,321.

A typical procedure for the preparation of polyisobutene from cationic quasi-living polymerization system is depicted below. The quasi-living polymerization may be conducted as a batch process, a continuous process, a semi-batch process or by any process known by persons skilled in the art. The polymerization reaction is typically carried out under inert gas and in a substantially anhydrous environment.

The reactor is charged with the following reactants:
1. a diluent,
2. an initiator,
3. an electron donor, or common ion salt, or its precursor,
4. one or more monomers, and
5. a Lewis acid, which typically comprises a halide of titanium or boron;

The reaction mixture is equilibrated at the desired temperature, ranging from about −130° C. to about 10° C. The method of the present invention may be carried out at any desired pressure, atmospheric, sub-atmospheric or super-atmospheric pressure. The progress of the polymerization reaction is monitored in situ by determination of the amount of monomer remaining in the reaction mixture. After high conversion of the monomer is observed, an aliquot is removed for determination of the pre-quench chain end composition before addition of the quenching agent. The polymerization reaction in the aliquot is terminated with an appropriate alcohol equilibrated at the desired temperature.

6. One or more quenching agents is added to the reaction mixture to quench the polymerization reaction.

Although, the concentration of the reactants may be varied to obtain the desired product, it has been found that certain ratios of the reactants are preferred for obtaining high exo-olefin chain end yield. The ratios are described below:

The molar ratio of monomer to initiator is in the range from about 3:1 to about 20,000:1. Preferably the molar ratio of monomer to initiator is in the range of about 5:1 to about 2,000:1. More preferably the molar ratio of monomer to initiator is about 10:1 to 150:1. The mole ratio of monomer to initiator controls the final molecular weight of the polyolefin.

The molar ratio of Lewis acid to chain ends is in the range from about 0.1:1 to about 2,500:1. Preferably the molar ratio of Lewis acid to chain ends is in the range of about 2:1 to about 200:1. More preferably the molar ratio of Lewis acid to chain ends is about 2:1 to 15:1.

The molar ratio of Lewis acid to electron donor is in the range from about 1.1:1 to about 10,000:1. Preferably the molar ratio of Lewis acid to electron donor is in the range of about 2:1 to about 100:1. More preferably the molar ratio of Lewis acid to electron donor is about 4:1 to 30:1.

The molar ratio of Lewis acid to quenching agent is in the range from about 1.1:1 to about 2,500:1. Preferably the molar ratio of Lewis acid to quenching agent is in the range of about 2:1 to about 100:1. More preferably the molar ratio of Lewis acid to quenching agent is about 2:1 to 15:1.

The molar ratio of quenching agent to chain ends is in the range from about 0.25:1 to about 20:1. Preferably the molar ratio of quenching agent to chain end is in the range of about 0.5:1 to about 5:1. More preferably the molar ratio of quenching agent to chain end is about 0.5:1 to 4:1.

Additional aliquots may be removed from the reaction mixture at various time intervals after addition of the quenching agent to determine the concentration of the exo-olefin chain ends on the polyolefin polymers. The polymerization reaction is terminated in all the aliquot samples and the remaining reaction mixture with an appropriate alcohol equilibrated at the desired temperature.

The concentration of the exo-olefin chain ends, along with the concentration of the endo-olefin and tert-chloride chain ends, is quantified using $^1$H NMR. GPC spectra are also obtained to qualitatively determine the amount of the coupled product, wherein the coupled product refers to the reaction product of the carbenium product with the exo-olefin.

The quasi-living polymerization and/or contacting with the quenching agent reaction(s) may be conducted batchwise or as a semicontinuous or continuous operation in which continuous streams of ingredients are delivered to the reactor; appropriate reactor systems include but are not limited to continuously stirred tank reactor systems, wherein an overflow of a slurry or solution of polymer is taken out for the recovery of the polymer therefrom, or plug flow reactors. Preferably, the reactor contents are stirred or agitated to achieve an even reactant distribution therein. Heterogeneous quenching agents can be effectively contacted with the quasi-living polymer using fixed bed and slurry reactors where the quenching agent is prepared as dispersion or in a fixed medium. The preferred mode of reaction is a batch process although theoretically a plug flow reactor may have process advantages. Typically, the reaction(s) are conducted in the liquid phase for ease of handling and to induce linear or chain type polymerization in contradistinction to ring or branch formation. If a feed is used which is gaseous under ambient conditions, it is preferred to control the reaction pressure and/or dissolve the feed in an inert solvent or liquid diluent, in order to maintain the feed in the liquid phase. For butane feeds, typical $C_4$ cuts comprising the feed are liquid under pressure and/or low temperatures and do not need a solvent or diluent. The temperature at which the reactions are carried out is important; depending upon the living or quasi-living system, too high a reaction temperature can diminish or eliminate the living character of the cationic polymerization.

Compounds suitable for use in the preparation of the polyolefin polymers of the present invention are given below:

Diluents

Diluents influence the ionization equilibrium and rates of exchange of growing species through their polarity, which can be estimated from their dielectric constants. Typically, solvents having low dielectric constants are preferred since ion pairs are less dissociated. Suitable solvents include, but are not limited to, low-boiling alkanes and alkyl mono or polyhalides with reasonably low freezing, points to be used at the preferred polymerization temperature. Illustrative solvents include alkanes (generally $C_2$ to $C_{10}$ alkanes, including normal alkanes such as propane, normal butane, normal pentane, normal hexane, normal heptane, normal octane, normal nonane and normal decane, and branched alkanes including isobutane, isopentane, neopentane, isohexane, 3-methylpentane, 2,2-dimethylbutane, 2,3-dimethylbutane and the like), halogenated alkanes such as chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, iso-propyl chloride, 1,2-dichloropropane, or 1,3-dichloropropane, alkenes and halogenated alkenes (such as vinyl chloride, 1,1-dichloroethene, and 1,2-dichloroethene), carbon disulfide, sulfur dioxide, acetic anhydride, acetonitrile, benzene, toluene, methylcyclohexane, chlorobenzene, nitro-alkanes (such as nitropropane) to name a few of the representative liquid diluents or solvents useful in cationic polymerizations. Mixed solvents (for example combinations of those listed above) can also be used.

Initiators

Initiator compounds for living and quasi-living carbocationic polymerization are well known in the art. Initiators may be mono-functional or multi-functional depending on the desired product. Mono-functional and di-functional initiators are employed when the desired polymer is to be linear. For making star polymers the initiator should have more than two reactive moieties. The contemplated initiator compounds can be represented by the general formula $(X'-CR_aR_b)_nR_c$ wherein $R_a$, $R_b$ and $R_c$ are independently comprises at least one of alkyl, aromatic, alkyl aromatic groups, and can be the same or different, and X' is an acetate, etherate, hydroxyl group, or a halogen. $R_c$ has a valence of n, and n is an integer of one to 4. Preferably $R_a$, $R_b$ and $R_c$ are hydrocarbon groups containing one carbon atom to about 20 carbon atoms, preferably one carbon atom to about 8 carbon atoms. Preferably X' is a halogen and more preferably chloride. In some instances it is preferable to select the structure of $R_a$, $R_b$ and $R_c$ to mimic the growing species or monomer, e.g. a 1-phenylethyl derivative for polystyrene or 2,4,4-trimethyl pentyl derivative for polyisobutylene. Suitable compounds, include for example, cumyl, dicumyl and tricumyl halides, particularly the chlorides, i.e., 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2,4,4-trimethyl-2-chloropentane; 2-acetyl-2-phenylpropane, i.e., cumyl acetate; 2-propionyl-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri(cumylmethyl ether), and similar compounds. Other suitable examples can be found in U.S. Pat. No. 4,946,899. Particularly preferred examples are 2-chloro-2,4,4-trimethyl pentane (TMPCl), 1,3-di(2-chloro-2-propyl)benzene, 1,3,5 tri(2-chloro-2-propyl)benzene, and 1,3,-di(2-chloro-2-propyl)-5-tert-butylbenzene (bDCC).

The concentration of the chain ends in the total reaction mixture may be in the range from about 0.0001 moles per liter to about 2.0 moles per liter. Preferably the concentration of the chain ends is in the range from about 0.001 moles per liter to about 1.0 moles per liter. More preferably the concentration of the chain ends is in the range from about 0.005 moles per liter to about 0.5 moles per liter.

Electron Donors

Electron donors have been shown to convert traditional polymerization systems into living and/or quasi-living cationic polymerizations systems. The electron donor used in the present invention is not specifically limited to any particular compound or class of compounds. Examples include pyridines and alkyl amines, aprotic amides, sulfoxides, esters, metal compounds having an oxygen atom bonded to a metal atom, and others. Pyridine compounds include 2,6-di-tert-butylpyridine, 2,6-dimethylpyridine, 2,4-dimethylpyridine, 2,4,6-trimethylpyridine, 2-methylpyridine and pyridine. N,N-dimethylaniline and N,N-dimethyltoluidine may be also employed. Amide compounds include N,N-dimethylformamide, N,N-dimethylacetamide and N,N-diethylacetamide. An example of a sulfoxide compound is dimethyl sulfoxide. Diethyl ether is an example of an ether compound, and methyl acetate and ethyl acetate are examples of ester compounds. Phosphate compounds such as trimethyl phosphate, tributyl phosphate, triamide hexamethylphosphate may also be employed. Oxygen-containing metal compounds such as tetraisopropyl titanate are also useful as electron donors.

The concentration of the electron donors in the total reaction mixture may be in the range from about 0.001 moles per liter to about 0.1 moles per liter. Preferably the concentration of the electron donors is in the range from about 0.001 moles per liter to about 0.05 moles per liter. More preferably the concentration of the electron donors is in the range from about 0.002 moles per liter to about 0.02 moles per liter.

Common Ion Salts an Common Ion Salt Precursors

Common ion salts or salt precursors may be optionally added to the reaction mixture in addition to or replacement of the electron donor. Typically, these salts are used to increase the ionic strength, suppress free ions, and beneficially interact with ligand exchange. Particularly preferred are common ion salt precursors, for example tetra-n-butylammonium chloride (n-Bu$_4$NCl). The concentration of the common ion salts or salt precursors in the total reaction mixture may be in the range from about 0.0005 moles per liter to about 0.05 moles per liter. Preferably the concentration of the common ion salts or salt precursors is in the range from about 0.0005 moles per liter to about 0.025 moles per liter. More preferably the concentration of the common ion salt or salt precursors is in the range from about 0.001 moles per liter to about 0.007 moles per liter.

Monomers

Suitable monomers for use in the method of the present invention are isobutylene. This included isobutylene itself and also isobutenic C$_4$-hydrocarbon streams, for example C$_4$-raffinates, C$_4$-cuts for isobutane dehydrogenation, and C$_4$-cuts from steam crackers and FCC crackers (Fluid Catalyzed Cracking units) as long as they have been substantially freed of 1,3-butadiene contained therein. C$_4$-hydrocarbon streams suitable according to this invention generally comprise less than 5,000 ppm and preferably less than 2,00 ppm of butadiene. When C$_4$-cuts are used as starting material, the hydrocarbons other than isobutene assume the role of an inert solvent. Mixtures of monomers may be used, but, preferably substantially pure isobutylene is used. The concentration of the monomers in the total reaction mixture may be in the range from about 0.01 moles per liter to about 5.0 moles per liter. Preferably the concentration of the monomers is in the range from about 0.1 moles per liter to about 2.0 moles per liter. More preferably the concentration of the monomers is in the range from about 0.3 moles per liter to about 1.0 moles per liter. Most preferably the concentration of the monomers is 0.5 moles per liter.

Lewis Acids

Lewis acids that are suitable as catalysts for purposes of the invention include, but are not limited to, titanium and boron halides, particularly titanium tetrachloride and boron trichloride. Use of the titanium halides and particularly titanium tetrachloride is preferred. The strength of the Lewis acid and its concentration should be adjusted for the particular monomer. Additionally, the strength of these Lewis acids can be adjusted using nucleophilic additives. In some instances these Lewis acids are also referred to as co-initiators. The amount of the Lewis acid present in the initiator system may vary. However, it is desirable that the concentration of Lewis acid is sufficient to achieve an appropriate rate of polymerization and quenching. The Lewis acid concentration should not be so high as to precipitate the formed polymer. The concentration of the Lewis acid in the total reaction mixture may be in the range from about 0.001 moles per liter to about 3.0 moles per liter. Preferably the concentration of the Lewis acid is in the range from about 0.005 moles per liter to about 1.5 moles per liter. More preferably the concentration of the Lewis acid is in the range from about 0.05 moles per liter to about 1.0 mole per liter.

Quenching Agents

Quenching agents contemplated for use in preparation of the polyisobutene in the present invention are described herein below. The quenching agents of the present invention are capable of converting quasi-living carbocationically terminated polyolefin tert-chloride chain ends to the exo-olefin chain ends. Without being bound by any theory, for example, it is believed that for polyisobutylene, quenching agents of the present invention selectively catalyze the elimination of a proton from the gem-dimethyl carbon of the polyisobutylene chain end as shown below.

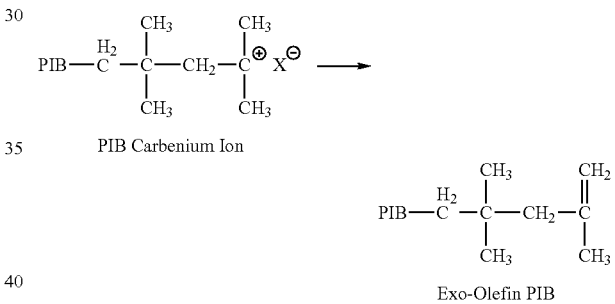

This result was unexpected since the agents with very similar structures are known in the prior art to quench quasi-living cationic polymerizations by an electrophilic aromatic substitution (EAS) mechanism as disclosed in U.S. Pat. No. 6,969,744. Compounds which provide the highest EAS yields are typically substituted with electron donating groups located at strategic positions on the ring. It is believed that these substituents provide stabilization for the Friedel-Craft intermediates formed when, for example, polyisobutylene carbenium ions react with olefins in the ring.

The quenching agents used in the present invention can be employed to convert polyisobutene polymer containing tert-halide chain ends to the exo-olefin chain ends independently of whether a mono-functional or a multi-functional is used. This rate of conversion is expected to be similar for mono-functional and di-functional initiators. Temperature dependence is observed for the preparation of the polyisobutylene polymers containing a high concentration of exo-olefin chain ends based on the total chain ends. It has been determined that raising the reaction temperature increases the yield of exo-olefin by suppressing coupling. Coupling is seen as a peak centered at 4.82 just up-field from the exo-olefin peak at 4.85 parts per million peak in the $^1$H NMR spectrum and also in the GPC spectrum, represented by a low elution volume shoulder on the main peak.

In one aspect, the conditions and systems for quasi-living polymerization conditions can be optimized in light of the subsequent quenching step. Without being bound by any theory, it is believed that the desired elimination reaction is in competition with the production of coupled product through reaction of the carbenium ion with already-formed exo-olefin. Therefore conditions that favor elimination and disfavor coupling are preferred. Higher reaction temperature has been found to favor elimination and disfavor coupling. In quasi-living cationic polymerization of isobutylene, an equilibrium exists between active, carbenium ions and dormant, tert-chloride chain ends. When the temperature of the system is raised, this equilibrium increasingly favors the dormant chain ends, but this should decrease the rates of elimination and coupling to an equal extent. However, higher temperature also should displace the equilibrium for the complex between quenching agent and Lewis acid toward un-complexed quenching agent, which is believed to be the agent that causes elimination. Raising the temperature thus provides a competitive advantage to the desired reaction. Temperature cannot be increased without limit. In fact, for certain quenching agents, the enthalpy of the quenching agent-Lewis acid complexation equilibrium is so strongly negative in the forward direction, that the quencher is only effective at higher temperatures and totally ineffective at lower temperatures. Thus, in general, the quenching process is beneficially carried out at higher temperatures; although, temperature cannot be increased without limit.

Chain-end concentration and its relationship to quenching agent concentration and Lewis acid concentration are important variables. Higher chain-end concentrations, which become necessary when low molecular weights are targeted, preferentially favor olefin coupling since that process is second order in polymer chains. Therefore, to maintain the desired dominance of the rate of elimination, quenching agent concentration and/or temperature should be increased. Both of these changes, however, have the undesirable effect of reducing the concentration of carbenium ions and thus retarding the conversion of chain ends to exo-olefin. Increasing quenching agent concentration diminishes the concentration of Lewis acid possibly through the formation of a complex between quenching agent and Lewis acid, and this would diminish the carbenium ion concentration since the latter varies approximately with the square of the Lewis acid concentration. Therefore, recipes targeting low molecular weight should be formulated with higher quenching agent concentrations and higher Lewis acid concentrations and preferably run at higher temperatures. An expedient way to reduce coupling at any target molecular weight is to dilute all reactants with additional diluent.

It has been found that in the presence of sufficient concentrations of a basic electron donor, improved conversions to exo-olefin chain ends can be attained when the quenching agent concentration is but a fraction of the quasi-living chain end concentration. This suggests that under these conditions, the quenching agent may remove a proton from the carbenium ion and subsequently transfers the proton to the electron donor. That is, the quenching agent may act as a catalyst for elimination, and the electron donor may serve as a proton acceptor. The use of a less-than-stoichiometric concentration (relative to chain ends) of quenching agent could confer economic advantages in practicing the method the present invention. On tire other hand, in the absence of a basic electron donor, for example, when the latter is replaced by a common ion salt or its precursor, it has been found that complete conversion of the chain ends to exo-olefin requires a stoichiometric or higher concentration of quenching agent. Under these conditions the quenching agent may serve as both catalyst and proton acceptor.

Suitable quenching agents are known in the art, U.S. Patent Application Pub. No. US 2006/0041083 incorporated herein by reference in its entirety, discloses nitrogen containing aromatic ring compounds, having at least two hydrocarbyl substituents attached to the aromatic ring (with the exclusion of 2,4 dimethylpyrrole; 1,2,5-trimethylpyrrole, 2-phenylindole, 2-methylbenzimidazole; 1,2 dimethylimidazole; and 2,4,5-triphenylimidazole).

A particularly preferred substituted-pyrrole quencher has the general formula i:

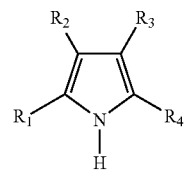

wherein:
a) $R_1$ and $R_4$ are independently alkyl containing one carbon atom to about 20 carbon atoms, $R_2$ and $R_3$ are independently hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or b) $R_1$ and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or c) $R_2$ and $R_3$ form a fused aromatic ring of from 6 carbon atoms to 10 carbon atoms or an aliphatic ring of from 4 carbon atoms to about 8 carbon atoms, and $R_1$ and $R_4$ are independently alkyl containing one carbon atom to about 20 carbon atoms; or d) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms with the proviso that the compound is not a 2,4-dimethylpyrrole; 1,2, 5-trimethylpyrrole; or 2-phenylindole substituted compound. Particularly preferred substituted pyrrole quenchers are wherein at least on $R_2$ or $R_3$ are hydrogen and particularly preferred is 2,5-dimethylpyrrole.

In another aspect, the nitrogen-containing five-membered aromatic ring quenching agent is a substituted imidazole of the general formula ii:

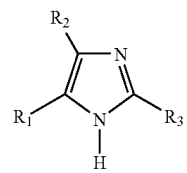

wherein $R_3$ is branched alkyl containing from about 4 carbon atoms to about 20 carbon atoms, and wherein $R_1$ and $R_2$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or $R_1$ and $R_2$ form a fused aromatic ring of from 6 carbon atoms to 10 carbon atoms or an aliphatic ring of from 4 carbon atoms to 8 carbon atoms, with the proviso that the compound is not 2-methylbenzimidazole; 1,2 dimethylimidazole; and 2,4,5-triphenylimidazole.

Another class of suitable quenching agents are hindered secondary or tertiary amines containing only carbon, hydrogen, and nitrogen atoms, provided the hindered secondary or tertiary amines are not: (a) triethylamine; (b) tri-n-butylamine; (c) trihexylamine; (d) triisooctylamine; (e) 2-phenylpyridine; (f) 2,3-cyclododenopyridine; (g) di-p-tolylamine; (h) quinaldine; and (i) 1-pyrrolidino-1-cyclopentene. The disclosure of these quenching agents are discussed in U.S. Patent Application Publication No. US 2006/0041084 incorporated herein in its entirety.

The quenching agents of the present invention are selected from substituted azoles containing a nitrogen atom and an oxygen or sulfur heteroatom, wherein the substituent(s) are selected so that the substituted azole is able to facilitate in preparing a vinylidene terminated polymer from a quasi-living carbocationically terminated polyolefin. Particularly preferred azoles containing one nitrogen atom and at least one oxygen or sulfur heteroatom are substituted at the 2, 4 and the 2, 4, 5 position.

The substituted azole may be substituted with from one to three hydrocarbyl or substituted hydrocarbyl groups wherein the term "hydrocarbyl" as used herein describe organic compounds or radicals consisting exclusively of the elements carbon and hydrogen. Furthermore, fused ring azoles of the present invention may optionally be substituted with up to four hydrocarbyl or substituted hydrocarbyl groups. These hydrocarbyl moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms. The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorus, boron, sulfur, or a halogen atom. Exemplary substituted hydrocarbyl moieties include, alkoxyalkyl, alkenyloxyalkyl, alkynyloxyalkyl, aryloxyalkyl, protected hydroxyalkyl, keto, acyl, protected aminoalkyl, alkylalkylthio, arylalkylthio, ketals, acetals, amides, esters and the like. Preferably the substituted azole is fully substituted meaning that the available positions on the heterocycle ring are substituted with hydrocarbyl or substituted hydrocarbyl groups.

The substituted azole quenching agents containing one nitrogen atom and one oxygen atoms are selected from substituted oxazole, preferably 2, 4, 5 substituted; and substituted benzooxazole. The substituted azole quenching agents containing one nitrogen atom and one sulfur atom are selected form substituted thiazole, preferably 2, 4, 5 substituted; and substituted benzothiazole. Particularly preferred quenching agents are represented according to the compounds of Formula I:

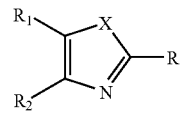

wherein:
$R_1$ and $R_2$ are independently hydrogen, alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; or $R_1$ and $R_2$ together form a fused aromatic ring having from 6 to 10 carbon atoms which may be unsubstituted or substituted with 1 to 4 substituents selected independently from alkyl of one carbon atom to about 20 carbon atoms, cycloalkyl of about 3 to about 7 carbon atoms, aryl of about 6 to about 30 carbon atoms, alkaryl of about 7 to about 30 carbon atoms, aralkyl of about 7 to about 30 carbon atoms, alkoxy of about 1 to 6 carbon atoms, alkylthioether of about 1 to 6 carbon atoms, halo, or amino of the formula—NR*R**, where R* and R** are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms; R is hydrogen, alkyl from 1 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms, with the proviso that when R is hydrogen, than $R_2$ is branched alkyl having at least three carbon atoms, aryl, cycloalkyl, alkaryl, or aralkyl, and with the further proviso that when R is methyl then $R_1$ and $R_2$ are independently selected from alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; and
X is oxygen or sulfur.

Another suitable quenching agent can be selected from the group consisting of substituted morpholine, substituted thiomorpholine, substituted phenothiazine, provided that the substituted morpholine is not 4-methylmorpholine; and substituted or unsubstituted dihydrobenzo[1,4]oxazine, dihydro[1,4]thiazine and phenoxazine. Suitable quenching agents may be selected fro the compounds according fro Formula Ia to IVa, illustrated below.

A suitable quenching agent selected from the compound according to Formula Ia:

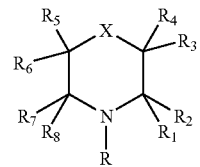

wherein:
$R_1$ through $R_8$ are independently hydrogen, alkyl from 1 to 20 carbon atoms, aryl from 6 to about 20 carbon atoms, alkaryl from about 7 to 30 carbon atoms, aralkyl from about 7 to 30 carbon atoms; R is hydrogen, alkyl from 1 to 20 carbon atoms, aryl from 6 to about 20 carbon atoms, alkaryl from about 7 to 30 carbon atoms, or aralkyl from about 7 to 30 carbon atoms; and X is oxygen or sulfur; with the proviso that when R is hydrogen or methyl then $R_1$, $R_2$, $R_7$ and $R_8$ must be other than hydrogen unless one of $R_1$ or $R_2$ and one of $R_7$ or $R_8$ is independently branched alkyl of about 3 to 20 carbon atoms, aryl, alkaryl or aralkyl.

Another suitable quenching agent can be selected from the compound according to Formula IIa:

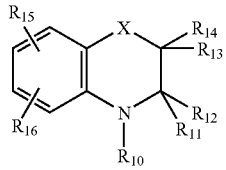

wherein $R_{10}$ through $R_{14}$ are independently hydrogen, alkyl from 1 to 20 carbon atoms, aryl from 6 to about 20 carbon atoms, alkaryl from about 7 to 30 carbon atoms, aralkyl from about 7 to 30 atoms; $R_{15}$ and $R_{16}$ are independently selected from hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, aralkyl of about 7 to about 30 carbon atoms, alkoxy of about 1 to 6 carbon atoms, alkylthioether of about 1 to 6 carbon atoms, halo, or amino of the formula—NR*R**, where R* and R** are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms; and X is oxygen or sulfur;

with the proviso that when $R_{10}$ is hydrogen then $R_{11}$ and $R_{12}$ must be other than hydrogen unless one of $R_{11}$ or $R_{12}$ is branched alkyl of about 3 to 20 carbon atoms, aryl, alkaryl or aralkyl.

Another suitable quenching agent can be selected from the compound according to Formula IIIa:

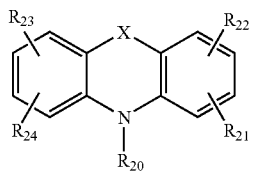

wherein $R_{20}$ is hydrogen, alkyl from 1 to 20 carbon atoms, aryl from 6 to about 20 carbon atoms, alkaryl from about 7 to 30 carbon atoms, aralkyl from about 7 to 30 carbon atoms; $R_{21}$ through $R_{24}$ is selected independently from hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, aralkyl of about 7 to about 30 carbon atoms, alkoxy of about 1 to 6 carbon atoms, alkylthioether of about 1 to 6 carbon atoms, halo, or amino of the formula—NR*R**, where R* and R** are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms; and X is oxygen or sulfur;

with the proviso that when $R_{20}$ is hydrogen then X is oxygen.

Another suitable quenching agent can be selected from the compound according to Formula IVa:

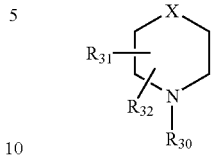

wherein $R_{30}$ is hydrogen, alkyl from 1 to 20 carbon atoms, aryl from 6 to about 20 carbon atoms, alkaryl from about 7 to 30 carbon atoms, or aralkyl from about 7 to 30 atoms; $R_{31}$ and $R_{32}$ are independently hydrogen, alkyl from 1 to 20 carbon atoms, aryl from 6 to about 20 carbon atoms, alkaryl from about 7 to 30 carbon atoms, aralkyl from about 7 to 30 atoms; or $R_{31}$ and $R_{32}$ when adjacent to each other, together form a fused aromatic ring having from 6 to 10 carbon atoms which may be unsubstituted or substituted with 1 to 4 substituents selected independently from alkyl of one carbon atom to about 20 carbon atoms, cycloalkyl of about 3 to about 7 carbon atoms, aryl of about 6 to about 30 carbon atoms, alkaryl of about 7 to about 30 carbon atoms, aralkyl of about 7 to about 30 carbon atoms, alkoxy of about 1 to 6 carbon atoms, alkylthioether of about 1 to 6 carbon, atoms* halo, or amino of the formula—NR*R**, where R* and R** are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms; and X is oxygen or sulfur; with the proviso that when $R_{31}$ and $R_{32}$ are hydrogen then $R_{30}$ is not hydrogen or methyl.

Sulfonation

The polyisobutenyl sulfonic acids of this invention are prepared by reacting a mixture of polyisobutenes comprising by having at least 90 mole percent methyl-vinylidene, a number average molecular weight of about 350 to 5,000, and a ratio of weight average molecular weight to number average molecular weight Mw/Mn of less than about 1.4; with a sulfonating agent containing a source of sulfur trioxide, —$SO_3$—. The source of—$SO_3$— can be a mixture of sulfur trioxide and air, sulfur trioxide hydrates, sulfur trioxide amine complexes, sulfur trioxide ether complexes, sulfur trioxide phosphate complexes, acetyl sulfate, a mixture of sulfur trioxide and acetic acid, sulfamic acid, alkyl sulfates or chlorosulfonic acid. The reaction may be conducted neat or in any inert anhydrous solvent. The conditions for sulfonation are not critical. Reaction temperatures can range from −30° C. to 200° C. and depends on the particular sulfonating agent employed. For example, acetyl sulfate requires low temperatures for reaction and elevated temperatures should be avoided to prevent decomposition of the product. Reaction time can vary from a few minutes to several hours depending on other conditions, such as reaction temperature. The extent of the reaction can be determined by titration of sulfonated polyisobutene after any free sulfuric acid has been washed out. Typical mole ratios of polyisobutene to sulfonating agent can be about 0.9 to 1.2.

The preferred sulfonating agent is acetyl sulfate (or a mixture of sulfuric acid and acetic anhydride which forms acetyl sulfate in situ) which produces the polyisobutenyl sulfonic acid directly. Other sulfonating agents, such as a mixture of sulfur trioxide and air, may produce a sultone intermediate that needs to be hydrolyzed to the sulfonic acid. This hydrolysis step can be very slow.

The polyisobutenes have a number average molecular weight in the range of about 350 to about 5000. Polyisobutenes having number average molecular weights of about 550, 1000 or 2300 are particularly useful. The polyisobutenes employed in the invention have a high degree of exo-olefin or methyl-vinylidene having at least 90 mole percent, preferably at least 95 and more preferably having at least 98 to 100 mole percent methyl-vinylidene. Likewise, the polyisobutenes employed have a narrow molecular weight distribution ($M_w/M_n$) preferably less than about 1.4, more preferably of about 1.01 to about 1.3, and most preferably 1.2 or less.

The polyisobutenyl sulfonates of this invention are prepared by reacting the polyisobutenyl sulfonic acid (prepared as described above) with a source of an alkali or alkaline earth metal. The alkali or alkaline earth metal can be introduced into the sulfonate by any suitable means. One method comprises combining a basically reacting compound of the metal, such as the hydroxide, with the polyisobutenyl sulfonic acid. This is generally carried out in the presence of a hydroxylic promoter such as water, alcohols such as 2-ethyl hexanol, methanol or ethylene glycol, and an inert solvent for the sulfonate, typically with heating. Under these conditions, the basically reacting compound will yield the metal sulfonate. The hydroxylic promoter and solvent can then be removed to yield the metal sulfonate.

Under certain circumstances, it may be more convenient to prepare an alkali metal polyisobutenyl sulfonate and convert this material by metathesis into, an alkaline earth metal sulfonate. Using this method, the sulfonic acid is combined with a basic alkali metal compound such as sodium or potassium hydroxide. The sodium or potassium sulfonate obtained can be purified by aqueous extraction. Then, the sodium or potassium sulfonate is combined with an alkaline earth metal salt to form the alkaline earth metal sulfonate. The most commonly used alkaline earth metal compound is a halide, particularly a chloride. Typically, the sodium or potassium sulfonate is combined with an aqueous chloride solution of the alkaline earth metal and stirred for a time sufficient for metathesis to occur. Thereafter, the water phase is removed and the solvent may be evaporated, if desired.

The preferred low molecular weight polyisobutenyl sulfonates having a molecular weight of less than 1000 are derived from alkaline earth metals, especially those of calcium, barium and magnesium; with calcium and magnesium being the most preferred. For the high molecular weight polyisobutenyl sulfonate Ionic dispersants, having a molecular weight of greater than 2,000 are preferably derived from alkali metals, preferably sodium and potassium.

In another fashion the polyisobutenyl sulfonic acid can be neutralized with an ashless base, such as ammonium hydroxide, tetra-methyl ammonium hydroxide, tetra-n-butyl ammonium hydroxide. Ashless polyisobutylene sulfonate having molecular weight of 350 to 5000 with 2,000 to 5,000 are particularly preferred.

The polyisobutenyl sulfonates of this invention are either neutral or overbased sulfonates. Overbased materials are characterized by a metal content in excess of that which would be present according to the stoichiometry of the metal cation in the sulfonate said to be overbased. Thus, a monosulfonic acid when neutralized with an alkaline earth metal compound, such as a calcium compound, will produce a normal sulfonate containing one equivalent of calcium for each equivalent of acid. In other words, the normal metal sulfonate will contain one mole of calcium for each two moles of the monosulfonic acid.

By using well known procedures, overbased or basic complexes of the sulfonic acid can be obtained. These overbased materials contain amounts of metal in excess of that required to neutralize the sulfonic acid. Highly overbased sulfonates can be prepared by the reaction of overbased sulfonates with carbon dioxide under reaction conditions. A discussion of the general methods for preparing overbased sulfonates and other overbased products is disclosed in U.S. Pat. No. 3,496,105, issued Feb. 17, 1970 to LeSuer, which in incorporated by reference in its entirety.

The amount of overbasing can be expressed as a Total Base Number ("TBN"), which refers to the amount of base equivalent to one milligram of KOH in one gram of sulfonate. Thus, higher TBN numbers reflect more alkaline products and therefore a greater alkalinity reserve. The TBN for a composition is readily determined by ASTM test methods D664, D2896, D4739 of other equivalent methods. The overbased polyisobutenyl sulfonates of this invention can have relatively low TBN, i.e., about 0 to about 60, or relatively high TBN, i.e., greater than 60 to about 400.

The polyisobutenyl sulfonates of this invention are useful as additives in lubricating oils. They have good tolerance to water, a light color and provide good performance characteristics.

The lubricating oil compositions of this invention comprise a major amount of an oil of lubricating viscosity and a minor amount of the polyisobutenyl sulfonates of this invention. The oils can be derived from petroleum or be synthetic. The oils can be paraffinic, naphthenic, halosubstituted hydrocarbons, synthetic esters, or combinations thereof. Oils of lubricating viscosity have viscosities in the range from 35 to 55,000 SUS at 100° F., and more usually from about 50 to 10,000 SUS at 100° F. The lubricating oil compositions contain an amount of the polyisobutenyl sulfonates of this invention sufficient to provide dispersant properties, typically from about 0.1 weight percent to 10 weight percent, preferably from about 0.5 weight percent to about 7 weight percent.

Other conventional additives that can be used in combination with the polyisobutenyl sulfonates of this invention include oxidation inhibitors, antifoam agents, viscosity index improvers, pour point depressants, dispersants and the like.

The lubricating oil compositions of this invention are useful for lubricating internal combustion engines and automatic transmissions, and as industrial oils such as hydraulic oils, heat transfer oils, torque fluids, etc.

EXAMPLE 1

Preparation of Polyisobutene

A 4 neck, 5 L round bottom flask equipped with an overhead stirrer and thermocouple was submerged in a heptane bath maintained at −60° C. The apparatus and bath were enclosed within a glove box containing anhydrous nitrogen, as the inert atmosphere. The following were charged to the round bottom flask: 2144.7 ml hexane, 1429.8 mL methylchloride, 422.5 mL IB (5.17 mol), 19.95 g 2-chloro-2,4,4-trimethylpentane (0.134 mol), 14.2 mL 2,6-Lutidine, and 1.14 g tetra-n-butylammonium chloride. The mixture was allowed to stir until the solution reached thermal equilibrium at −60 C. Then, 64.7 mL (0.59 mol) $TiCl_4$ was charged to the reactor to initiate the isobutylene polymerization. The polymerization was allowed to proceed for 15 min, at which time 23.2 mL (0.228 mol) 2,5-dimethylpyrrole was charged to the reactor. The mixture was stirred for an additional 57 min., and the reaction was then terminated with 107.5 mL (2.657 mol) methanol.

The mixture was removed from the glove box and the volatiles were evaporated overnight under ambient conditions. The organic layer was extracted repeatedly with a 5% HCl/deionized $H_2O$ solution, washed with deionized $H_2O$ until neutral, and then dried over magnesium sulfate. The organic layer was then filtered through both Celite and silica gel and finally, the hexane was removed via vacuum distillation to afford approximately 275 g PIB (Mn=2240, Mw/Mn 1.11). The % methyl-vinylidene content for the 'quasi living' PIB was 98%

Sulfonation of Polyisobutene

To a 4-neck 250 mL round bottom flask equipped with an overhead stirrer, ice bath, condenser, thermocouple, and nitrogen inlet, was added 40.0 g 'quasi living' PIB prepared above (0.018 mol) followed by 50 mL of hexane/methylene chloride 15/85. To this was added at 10° C. 2.58 g acetic anhydride (0.025 mol), and 1.95 g sulfuric acid (0.019 mol). This was stirred for 4.5 hours and allowed to warm up to room temperature. Then the reaction was cooled to 10° C. and to the reaction was added 5 mL methanol. The product from this reaction was the $PIBSO_3H$. To this product was added sodium methoxide (1.13 g, 0.021 mol) in 3.4 g methanol and the reaction was stirred for 6 hours. Then the excess solvents were removed in vacuo to give the $PIBSO_3Na$ salt. This product contained 1.37% Na and 1.92% S.

COMPARATIVE EXAMPLE A

A high methyl-vinylidene PIB employing the $BF_3$ catalyzed method was prepared as disclosed in U.S. Pat. No. 5,408,018. This high methyl-vinylidene PIB was determined to have a $M_n$=2389, $M_w/M_n$=1.89 and the % methyl-vinylideoe content for the high methyl-vinylidene PIB was 85%, 1194.5 g of this high methyl-vinylidene PIB (0.5 mol) was used for the sulfonation reaction as disclosed in Example 1, with all the other reagents were used in the same molar proportions. The product from this reaction contained 1.05% and 1.72% S.

PERFORMANCE EXAMPLES

1. Low/High Temperature Performance:

The $PIBSO_3Na$ salts from the 'quasi living' (Example 1) and high methyl-vinylidene PIB (Comparative Example A) were tested by measuring the CCS and kv. This performance test was conducted to assess the low temperature and relative high temperature of the resulting polyisobutenyl sulfonates. The cold crank simulator (CCS) at −20° C. was measured using ASTM D5293. The kinematic viscosity (kv @100° C.) was measured using ASTM D445. The performance example solutions were made by taking the polyisobutenyl sulfonates of Example 1 and Comparative Example A and dissolving them at 4% and 8% by weight in Chevron 100 neutral diluent oil. The Chevron 100 neutral is a group 2 oil. These results are shown in Table 1.

TABLE 1

CCS and kv testing of $PIBSO_3Na$ made from 'quasi living' and high methyl-vinylidene PIB.

| Sample (in Oil) | Dose (wt/wt) | CCS, (cP) | kv, (cSt) |
|---|---|---|---|
| EXAMPLE 1 | 4% | 997 | 4.613 |
|  | 8% | 1205 | 5.208 |
| COMPARATIVE EXAMPLE A | 4% | 1016 | 4.749 |
|  | 8% | 1285 | 5.556 |

This data shows that Example 1 ($PIBSO_3Na$ salt made from the 'quasi living' PIB) had improved low temperature viscosity performance as measured in the CCS tests at both doses when compared to Comparative Example A ($PIBSO_3Na$ made from the high methyl-vinylidene PIB).

2. Intrinsic Viscosity Comparison

The intrinsic viscosity, or limiting viscosity number, can be used to characterize the capacity of a polymer to enhance the viscosity. The intrinsic viscosity is obtained by measuring the viscosity (kv at 100° C., for example) of a solution of a polymer in a solvent at a couple of different concentrations and determining the intrinsic viscosity from the equation:

$$[\eta] = \lim_{c \to 0} (\eta - \eta_0)/(\eta_0 * c)$$

where $[\eta]$ is the intrinsic viscosity, $\eta$ is the solution viscosity, $\eta_0$ is the solvent viscosity, and c is the concentration in g/100 mL.

Intrinsic viscosity measurements were carried out by first measuring the kinematic viscosity @100° C. of the Example 1 ($PIBSO_3Na$ salt made from the 'quasi living' PIB) and Comparative Example A ($PIBSO_3Na$ salt made from high methyl-vinylidene PIB) dissolved in RLOP 100N diluent oil as the solvent. The concentrations that we used were 1.706, and 3.412 g sample/100 mL. The kinematic viscosity was measured with a capillary viscometer using the procedure described in ASTM D445.

Then the relative viscosity ($\eta_r$) was calculated by dividing the viscosity of the solution by the viscosity of the solvent.

$$\eta_r = \eta_{solution}/\eta_{solvent}$$

The specific viscosity ($\eta_{sp}$) is defined as the fractional change in viscosity upon addition of a polymer, and equals $$\eta_{sp} = (\eta_{solution} - \eta_{solvent})/\eta_{solvent}$$

Since both $\eta_r$ and $\eta_{sp}$ depend on concentration, we plot $\eta_{sp}$ versus concentration, and extrapolate to zero concentration to give the intrinsic viscosity ($[\eta]$), which is the intercept. The intrinsic viscosity represents essentially the volume occupied by a polymer per unit mass:

$[\eta]$ is proportional to $R^3/M$ where M is the polymer molecular weight.

TABLE 2

Intrinsic viscosity

| SAMPLE (in diluent oil as solvent) | Intrinsic Viscosity $[\eta]$ (dl/g) |
|---|---|
| EXAMPLE 1 ($PIBSO_3Na$ salt made from the 'quasi living' PIB) | 0.073 |
| COMPARATIVE EXAMPLE A ($PIBSO_3Na$ salt made from high methyl-vinylidene PIB) | 0.087 |

The higher the value for the intrinsic viscosity, the better able a polymer is to increase the viscosity. Of course for lubricating oil additives, low temperature properties are important and a low value of the intrinsic viscosity for an additive is desirable. The data illustrated in Table 2, demonstrates that EXAMPLE 1 ($PIBSO_3Na$ salt made from the 'quasi living' PIB) has a lower $[\eta]$ (and accordingly a smaller volume) than the $[\eta]$ for the COMPARATIVE EXAMPLE A ($PIBSO_3Na$ salt made from the high methyl-vinylidene PIB). Thus in comparison, Example 1 of the present invention, with die lower intrinsic viscosity values would have improved low temperature characteristics.

What is claimed is:

1. A process for preparing a polyisobutenyl sulfonate comprising:
   a. polymerizing isobutene in a quasi-living polymer system to form a quasi-living carbocationically terminated polymer comprising contacting an isobutene monomer with an initiator in the presence of a Lewis Acid selected from the group consisting of titanium tetrahalide, boron trichloride, aluminum trichloride, tin tetrachloride, zinc chloride, and ethyl aluminum dichloride, and a solvent, under suitable quasi-living polymerization reaction conditions to obtain a polymer having a number average molecular weight of about 350 to 5,000, and a ratio of weight average molecular weight to number average molecular weight $M_w/M_n$ of less than about 1.4;
   b. contacting the polymer prepared in step a) with a suitable quenching agent whereby said quenching agent converts the quasi-living carbocationically terminated polymer to a polyisobutene polymer having at least 90 mole percent methyl-vinylidene content, wherein the suitable quenching agent is a dihydrocarbyl substituted nitrogen-containing five-membered aromatic compound selected from substituted pyrrole and substituted imidazole wherein the substituents are selected so that the substituted pyrrole or substituted imidazole is able to facilitate in preparing a vinylidene terminated polymer from a quasi-living carbocationically terminated polyisobutene;
   c. reacting the polyisobutene polymer of step b) with a sulfonating agent in a ratio of 0.9 to 1.2 and thereafter neutralizing with a source of alkali metal or alkaline earth metal.

2. The process of claim 1, wherein the initiator is monofunctional.

3. The process of claim 2, wherein the initiator is selected from the group consisting of 2-chloro-2-phenylpropane; 2-acetyl-2-phenylpropane; 2-propionyl-2-phenylpropane, 2-methoxy-2-phenylpropane, 2-ethoxy-2-phenylpropane, 2-chloro-2,4,4-trimethylpentane, 2-acetyl-2,4,4,-trimethylpentane, 2-propionyl-2,4,4-trimethylpentane, 2-methoxy-2,4,4-trimethylpentane, and 2-ethoxy-2,4,4-trimethylpentane.

4. The process of claim 3, wherein the initiator is 2-chloro-2,4,4-trimethylpentane.

5. The process of claim 1 wherein the Lewis acid is selected from the group consisting of titanium tetrachloride, titanium tetrabromide, and boron trichloride.

6. The process of claim 5, wherein the Lewis acid is titanium tetrachloride.

7. The process of claim 1, wherein the quasi-living polymerization reaction conditions are selected to have a temperature range between −60° C. and −10° C.

8. The process of claim 1, wherein the quenching agent is a substituted pyrrole of the formula:

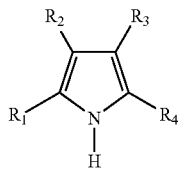

wherein:
a) $R_1$ and $R_4$ are independently alkyl containing one carbon atom to about 20 carbon atoms, $R_2$ and $R_3$ are independently hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
b) $R_1$ and $R_4$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
c) $R_2$ and $R_3$ form a fused aromatic ring of from 6 carbon atoms to 10 carbon atoms or an aliphatic ring of from 4 carbon atoms to about 8 carbon atoms, and $R_1$ and $R_4$ are independently alkyl containing one carbon atom to about 20 carbon atoms; or
d) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms; and with the proviso that the compound is not a 2,4-dimethylpyrrole; 1,2,5-trimethylpyrrole; or 2-phenylindole substituted compound.

9. The process of claim 1, wherein the polyisobutene polymer obtained in step b) having at least 90 mole percent methyl-vinylidene content is characterized by having a number average molecular weight of about 350 to 5,000, and a ratio of weight average molecular weight to number average molecular weight $M_w/M_n$ of from 1.01 to 1.3.

10. The process of claim 9, wherein the ratio of weight average molecular weight to number average molecular weight $M_w/M_n$ is 1.1 or less.

11. The process of claim 9, wherein the polyisobutene is characterized by having at least 95 mole percent methyl-vinylidene.

12. The process of claim 9, wherein the polyisobutene is characterized by having at least 98 to 100 mole percent methyl-vinylidene.

13. The process of claim 9, wherein the polyisobutene is characterized by having a number average molecular weight of less than about 550.

14. The process of claim 9, wherein the polyisobutene is characterized by having a number average molecular weight of greater than about 1000.

15. The process of claim 9, wherein the polyisobutene is characterized by having a number average molecular weight of greater than about 2000.

16. The process of claim 9, wherein a stoichiometric excess of metal in employed in the neutralization.

17. The process of claim 16, further comprising overbasing the product of step c.

18. The process of claim 1, wherein the polyisobutene polymer obtained in step b) has a ratio of weight average molecular weight to number average molecular weight $M_w/M_n$ of less than 1.2.

19. The process of claim 1, wherein the polyisobutene polymer obtained in step b) has at least 95 mole percent methyl-vinylidene content and a ratio of weight average molecular weight to number average molecular weight $M_w/M_n$ of less than 1.2.

* * * * *